US010602059B2

(12) United States Patent
Beers et al.

(10) Patent No.: US 10,602,059 B2
(45) Date of Patent: Mar. 24, 2020

(54) METHOD FOR GENERATING A PANORAMIC IMAGE

(71) Applicant: Cyclomedia Technology B.V., Zaltbommel (NL)

(72) Inventors: Bart Johannes Beers, Rumpt (NL); Peter Joosten, Rotterdam (NL)

(73) Assignee: Cyclomedia Technology B.V., Zaltbommel (NL)

( * ) Notice: Subject to any disclaimer, the term of this patent is extended or adjusted under 35 U.S.C. 154(b) by 490 days.

(21) Appl. No.: 14/777,016

(22) PCT Filed: Mar. 17, 2014

(86) PCT No.: PCT/NL2014/050158
§ 371 (c)(1),
(2) Date: Sep. 15, 2015

(87) PCT Pub. No.: WO2014/142669
PCT Pub. Date: Sep. 18, 2014

(65) Prior Publication Data
US 2016/0044240 A1 Feb. 11, 2016

(30) Foreign Application Priority Data

Mar. 15, 2013 (NL) .................................. 2010463

(51) Int. Cl.
*H04N 5/232* (2006.01)
*G06T 3/00* (2006.01)
(Continued)

(52) U.S. Cl.
CPC ......... *H04N 5/23238* (2013.01); *G06T 3/005* (2013.01); *G06T 7/344* (2017.01);
(Continued)

(58) Field of Classification Search
CPC ......... G06T 3/005; G06T 17/20; G06T 7/344; G06T 2207/10024; G06T 2207/10028;
(Continued)

(56) References Cited

U.S. PATENT DOCUMENTS 6,434,278 B1 * 8/2002 Hashimoto ............. G06T 17/00
345/583
8,977,074 B1 * 3/2015 Berent .................. G06T 15/205
345/419

(Continued)

FOREIGN PATENT DOCUMENTS

| EP | 1903534 A1 | 3/2008 |
| WO | 2005081191 A1 | 9/2005 |
| WO | 2011153264 A2 | 12/2011 |

OTHER PUBLICATIONS

Abdelhafiz et al., "Towards a 3D True Colored Space by the Fusion of Laser Scanner Point Cloud and Digital Photos", Institut fur Geodasie and Photogrammetrie, Technische Universitat Braunschweig, pp. 1-7, Braunschweig, Germany.

(Continued)

*Primary Examiner* — Christopher S Kelley
*Assistant Examiner* — Boubacar Abdou Tchoussou
(74) *Attorney, Agent, or Firm* — The Webb Law Firm

(57) ABSTRACT

A method for generating a panoramic image includes providing a 3D point model of an area surrounding a virtual viewpoint, acquiring multiple images of the area surrounding the virtual viewpoint, projecting the acquired images onto the 3D point model and generating the panoramic image using the thus obtained 3D point model of the surrounding area.

20 Claims, 7 Drawing Sheets

(51) Int. Cl.
*G06T 7/33* (2017.01)
*G06T 17/20* (2006.01)

(52) U.S. Cl.
CPC ......... G06T 17/20 (2013.01); H04N 5/23229 (2013.01); *G06T 2200/04* (2013.01); *G06T 2207/10024* (2013.01); *G06T 2207/10028* (2013.01); *G06T 2207/30252* (2013.01)

(58) Field of Classification Search
CPC ...... G06T 2207/30252; H04N 5/23229; H04N 5/23238
USPC .................................................. 348/74, 148
See application file for complete search history.

(56) References Cited

U.S. PATENT DOCUMENTS

| | | |
|---|---|---|
| 2002/0089765 A1 | 7/2002 | Nalwa |
| 2007/0065002 A1* | 3/2007 | Marzell ............... G06T 17/00 382/154 |
| 2010/0091020 A1* | 4/2010 | Kmiecik ............... G01C 11/02 345/427 |
| 2010/0118116 A1* | 5/2010 | Tomasz ............... G01C 11/02 348/36 |
| 2013/0128860 A1 | 5/2013 | Zhang |

OTHER PUBLICATIONS

Geng et al., "A Mobile System Using Lidar and Photogrammetry for Urban Spatial Objects Extraction", International Conference on Information Engineering and Computer Science (ICIECS 2009), Dec. 19, 2009, pp. 1-4.

Sinha et al., "Interactive 3D Architectural Modeling from Unordered Photo Collections", ACM Transactions on Graphics, Dec. 1, 2008, pp. 1-10, vol. 27, No. 5.

TP-Link, "TL-SC3130/TL-SC3130G MSN View Guide", Retrieved from the Internet: URL:http://www.tp-link.com/download/ipcamera/MSN_View_Guide.pdf [retrieved on Mar. 28, 2012], Aug. 20, 2011, pp. 1-6.

* cited by examiner

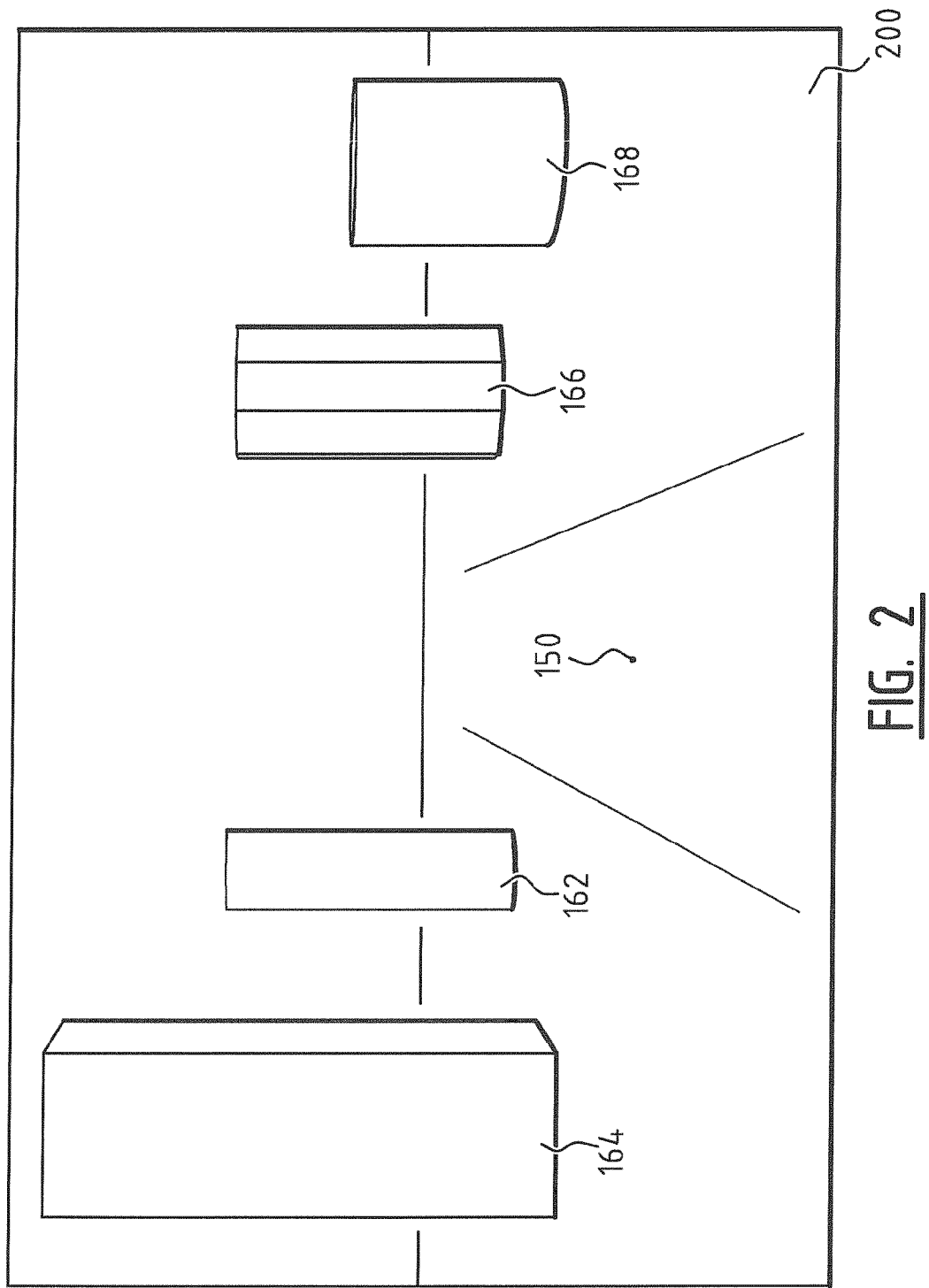

METHOD FOR GENERATING A PANORAMIC IMAGE

CROSS-REFERENCE TO RELATED APPLICATIONS

This application is the United States national phase of International Application No. PCT/NL2014/050158 filed Mar. 17, 2014, and claims priority to Netherlands Patent Application No. 2010463 filed Mar. 15, 2013, the disclosures of which are hereby incorporated in their entirety by reference.

BACKGROUND OF THE INVENTION

Field of the Invention

The present invention relates to a method for generating a panoramic image.

Description of Related Art

In the context of the present invention a panoramic image is understood to mean an image which can be acquired by means of a plurality of optical cameras, the individual images of which are combined to form the panoramic image and wherein the field of view displayed by the panoramic image is greater than the fields of vision associated with the optical cameras with which the individual images have been acquired. Field of view is understood here to mean that part of the surrounding area seen from a determined position and orientation which can be viewed by an optical camera or can be displayed by the panoramic image.

Panoramic images can for instance provide information about infrastructure which can be used by governments, estate agents, utility companies, banks, insurance companies and others for the purpose of evaluating local situations, for instance the location of property, the state of infrastructural objects and local traffic situations.

In view of the above stated application an important requirement for panoramic images is that the dimensions of the elements in the image, such as the height or width of a building or road, are sufficiently accurate.

There is also a constant desire to increase the resolution of the panoramic images. Because the resolution of the optical cameras is not sufficient, a plurality of optical cameras have to be used.

A further requirement is that the individual images used to generate the panoramic image can be acquired by means of a system mounted on top of or on a moving vehicle, and that the optical cameras can record the images while the vehicle is in motion. If this were not the case, it would be more difficult to collect a sufficient number of images for a large area such as a region, local area or country.

A known problem when combining multiple images is that these images have generally not been acquired from the same position and with the same optical camera. Parallax errors will hereby occur. A number of techniques are known for preventing these errors.

In a first technique use is made of a rotatably mounted optical camera. By not displacing but only rotating the camera, multiple images can be acquired from more or less the same position. A drawback of this technique is that it is not suitable for acquiring images from a moving vehicle.

A further known technique is known from US 2002/0089765 A1 and relates to placing of optical cameras and mirrors in a frame such that light incident on a mirror is reflected to an optical camera, this in a way such that the virtual entrance pupil associated with this optical camera is the same as in the other cameras in the frame. This achieves that all cameras view images virtually from the same position, despite the fact that the cameras all have a different orientation. A drawback of this technique is that obtaining an identical virtual entrance pupil for all cameras imposes requirements in respect of placing of the cameras, whereby this approach is less suitable for increasing the number of cameras, particularly because the desired placing is sometimes impossible because of the physical dimensions of the cameras.

Another technique is known from EP 1 903 534 A1 and relates to two optical cameras which are placed one behind the other on a longitudinal axis of a vehicle on the roof of this vehicle. Because the vehicle moves it is possible to achieve by means of a suitable control of the cameras for recording an image that, at the time the image is being recorded, each camera is located at the same position relative to the surrounding area. A drawback of the technique is that it is limited to cameras placed one behind the other in the longitudinal direction of the vehicle. The increasing in the number of cameras can hereby be described as limited. Another drawback is that parallax errors can still occur when bends are negotiated.

SUMMARY OF THE INVENTION

It is an object of the present invention to provide a method for generating a panoramic image of an area surrounding a virtual viewpoint as seen from the virtual viewpoint and corresponding to a predetermined field of view making use of multiple images, this panoramic image having no or few parallax errors and wherein the above stated drawbacks do not occur, or hardly so.

According to the invention the method comprises of providing a three-dimensional (3D) point model of an area surrounding the virtual viewpoint, wherein the 3D point model comprises points with position information and/or is formed thereby and/or consists hereof, the points corresponding to one or more elements around the virtual viewpoint at a position corresponding to the position information. The panoramic image corresponds to an image which would be acquired if an optical camera were used at the virtual viewpoint which record determines the field of view associated with the panoramic image. Such a camera having the desired resolution and the desired field of view does not generally exist, whereby multiple images have to be used.

A point in the 3D point model preferably corresponds to the presence of a peripheral structure of an object at a location in the space corresponding to the position information of that point. An example hereof is a collection of points in the 3D point model corresponding to an outer wall or facade of a building.

The points from the 3D point model correspond to one or more elements around the virtual viewpoint. Substantially the whole area surrounding the virtual viewpoint is for this purpose preferably scanned for the purpose of collecting the points for the 3D point model. The scanning itself need not take place here from the virtual viewpoint. The 3D point model is however preferably complete to the extent that it is possible to provide a faithful panoramic image associated with the virtual viewpoint and preferably having a random field of view, and particularly having a 360-degree field of view.

The method further comprises of acquiring multiple images of the area surrounding the virtual viewpoint, each image acquired from a known position and with a known orientation, wherein the images comprise colour information about at least a part of the one or more elements. The images generally correspond here to digital colour photos.

The method further comprises of projecting the acquired images onto the 3D point model in order to obtain a 3D point model with colour information per point. In this step the colour of the point in the 3D point model is determined by means of correlation between points from the 3D point model and the acquired image, more particularly elements from that image. An example hereof is that a point in the 3D point model corresponding to a location on a concrete wall of a building is correlated with the same location in the digital photo of the wall or the building. The colour in the digital photo of this location is used as a basis for assigning a colour to the point from the 3D point model. The colour will generally be corrected in order to take account of ambient factors such as other changing light conditions.

The final step of the method comprises of generating the panoramic image using the thus obtained 3D point model of the surrounding area. The 3D point model comprises position information and colour information. It is therefore possible to calculate what the panoramic image must be as seen from the virtual viewpoint and with a given field of view.

Known from "Towards a 3D true colored space by the fusion of laser scanner point cloud and digital photos", by A. Abdelhafiz et al., ISPRS XXXVI-5/W17, is a technique for calculating a 3D model of an object. This technique likewise comprises of providing a 3D point model and using multiple images for the purpose of assigning colour to points in the 3D point model. This technique is however aimed at determining a colour 3D point model. A view of the object can be generated with such a model. This document does not have the object of providing panoramic images. In contrast to the present invention, in this document a 3D point model is not obtained with points corresponding to one or more elements around the virtual viewpoint at a position corresponding to the position information. The same consideration applies for acquiring the images. This takes place not from a position falling within the 3D point model, but only outside it.

According to the invention the virtual viewpoint is preferably situated on or in the smallest enclosing sphere, ellipsoid, beam or box which encloses all points from the 3D point model. This means that the virtual viewpoint is preferably located in the 3D point model.

The 3D point model according to the invention preferably provides information about the presence of the one or more elements in directions corresponding to an angle of view in the horizontal plane, as seen from the virtual viewpoint, of 180 degrees or more, preferably of at least 270 degrees, and more preferably of 360 degrees. In addition or instead, the 3D point model according to the invention preferably provides information about the presence of the one or more elements in directions corresponding to an angle of view in the vertical plane, as seen from the virtual viewpoint, of at least 120 degrees, preferably of at least 150 degrees, and more preferably of 180 degrees. A unit which is placed at the virtual viewpoint and which rotates can for instance thus be used to scan the surrounding area. It is however not necessary for the present invention that the information associated with the different directions is obtained from one and the same position.

Providing a 3D point model preferably comprises of scanning the area surrounding the virtual viewpoint with a distance determining unit from one or more known positions for the purpose of determining a distance between the one or more known positions and the one or more elements. Determining distance is an example here of scanning the surrounding area. Other techniques in which the scanning provides information about the presence of an object but wherein distance is not directly measured but can be derived indirectly are not precluded here. The use of a plurality of distance determining units is not precluded either. Such units can be used simultaneously or sequentially.

Providing the 3D point model preferably comprises of combining multiple distance determinations relating to the same element from different known positions. It hereby becomes possible for instance to obtain information about features of an element, such as a wall, which are not visible from the virtual viewpoint.

Providing the 3D point model preferably comprises of moving along a path a vehicle on which the distance determining unit is mounted, wherein the vehicle is stationary or moves during the distance determination. Because the vehicle moves, the distance determination does not take place at the virtual viewpoint. The area surrounding this viewpoint can however be scanned adequately. It will be apparent to the skilled person that the speed of the vehicle and/or the speed of scanning will optionally have to be modified if there are many elements around the virtual viewpoint in order to prevent possible obstruction of the scanning by an element.

The vehicle can comprise a plurality of units which are directed at different angles. This is particularly advantageous when the distance determining unit has a limited field of view.

In order to prevent the area surrounding the virtual viewpoint being displayed incorrectly on the panoramic image because elements are present between the virtual viewpoint and one or more positions from which the surrounding area is scanned, the shortest distance between the path along which movement takes place and the virtual viewpoint can be made smaller than a predetermined value.

The distance determining unit preferably comprises a Light Detection And Ranging (LIDAR) unit.

The field of view of the panoramic image in the horizontal plane is preferably equal to or more than 180 degrees, more preferably at least 270 degrees and still more preferably 360 degrees. The field of view of the panoramic image in the vertical plane is preferably equal to or more than 120 degrees, more preferably at least 150 degrees and still more preferably 180 degrees. The method according to the present invention however allows the use of a random field of view. After all, a complete 3D model of the surrounding area provided with colour information is preferably available.

The position information preferably comprises three-dimensional position information relative to a predetermined origin. During scanning a distance is generally obtained between a viewed element and the position from which viewing takes place. This latter position can however be variable. By now relating all position information to the same origin, the information can be incorporated more easily into a model.

The multiple images preferably cover substantially the whole surrounding area as seen from the virtual viewpoint. If a panoramic image has a limited field of view, for instance 100 degrees in the horizontal plane, it is not necessary for the panoramic image that images are made of the whole surrounding area. It is however recommended that the field of view and the virtual viewpoint are adjustable by a user. This requirement can be met by now covering the whole surrounding area with images.

At least one of the acquired images preferably has fewer image elements therein than the generated panoramic image. An image element can refer here to an object in the image but also to a pixel of a digital photo. The resolution of the panoramic image, for instance measured in total number of pixels per photo, can be increased by making use of multiple images, each acquired with high resolution but relating to only a part of the surrounding area. As a result an image will often have fewer elements therein than the resulting panoramic image.

Acquiring multiple images of the area surrounding the virtual viewpoint preferably comprises of taking digital photos, each from a known position and each with a known field of view. The digital photos preferably each relate here to a segment of the area surrounding the virtual viewpoint. In addition, the fields of vision associated with at least two of the digital photos do not overlap and/or the position from which the photo has been taken differs in the case of at least two digital photos. The surrounding area is hereby in fact covered by a plurality of digital photos which serve as a mosaic.

Acquisition of the multiple images of the area surrounding the virtual viewpoint preferably comprises of moving along a path a vehicle on which the optical camera is mounted, wherein the vehicle is stationary or moves during acquisition of the multiple images. The shortest distance between the path along which movement takes place and the virtual viewpoint can here be smaller than a predetermined value.

It is not precluded that the vehicle for the distance determination and the vehicle for acquiring the images are the same vehicle. If there are two vehicles, it is recommended that both vehicles travel the same path.

The distance between the virtual viewpoint and each of the known positions from which the multiple images are acquired is preferably smaller than a predetermined value. This does not however rule out multiple photos being taken of the areas surrounding a plurality of virtual viewpoints. It is however recommended to group the photos which serve as colour information of an area surrounding a given virtual viewpoint and to ensure that the positions from which these photos have been taken are not too far from the virtual viewpoint itself.

The position from which an image of the multiple images is acquired or the known position(s) for the distance determination are preferably determined by means of a positioning system such as Global Positioning System GPS.

Projection of an image from the multiple images onto the 3D point model preferably comprises of assigning a colour to a point in the 3D point model, this colour being based on a colour of a corresponding point in the image, taking into account the position information of that point in the 3D point model, the position from which the image has been acquired and the field of view associated with the image. Use can be made here of imaginary projection lines extending from the position from which the image has been acquired, usually corresponding to the entrance pupil of an optical camera, through the image to a point or an imaginary point in the 3D point model corresponding to a point in the image through which the projection line passes. The position of the image between the 3D point model and the position from which the image has been acquired is determined here by, among other factors, the enlargement used and/or the field of view and/or the distance between an element in the 3D point model and the position from which the image has been acquired.

The assigned colour of a point in the 3D point model is based on the colour of a corresponding point in the image. It is possible to make correction here for the light intensity and/or light composition.

Projection of an image from the multiple images onto the 3D point model can more particularly comprise the steps of a) determining for a point from the image a corresponding point in the 3D point model which lies closest to the known position from which the image has been acquired and which is located less than a predetermined distance from a projection line which passes through the point from the image and the known position, and b) assigning a colour to the point in the 3D point model found in step a), wherein the colour is derived from the colour of the corresponding point from the image.

The method can comprise of improving the 3D point model on the basis of the existing 3D point model and an image from the multiple images. The improved 3D point model can also be used in generating the panoramic image.

An example of improvement of the 3D point model comprises the steps of a) determining for a point from the image a plurality of corresponding points in the 3D point model which lie closest to the known position from which the image has been acquired and which are located less than a predetermined distance from a projection line which passes through the point from the image and the known position, b) adding a point to the 3D point model, which added point is assigned position information corresponding to an interpolation of the position information of said plurality of corresponding points, and c) assigning a colour to the point added in step b), wherein the colour is derived from the colour of the corresponding point from the image. The number of points in the 3D point model can be increased with this method.

In addition to searching for corresponding points between an image and the 3D point model, the method according to the present invention can further comprise the steps of extracting a first object characteristic from the 3D point model and extracting a second object characteristic, corresponding to the first object characteristic, from an image from the multiple images. Projection of an image from the multiple images onto the 3D point model can then also be based on a similarity between the first and second object characteristics. The method can for example comprise of determining a relative position error between the image and the 3D point model by determining the distance between the position of the first object characteristic and the second object characteristic. The position information of a point in the 3D point model, the known position and/or the orientation from which the image has been acquired can be corrected here using the relative position error. Use can be made here of a weighting related to accuracy information. A greater correction in the known position can thus be made as the accuracy of this position decreases relative to the orientation and/or the position information of a point in the 3D point model. Determining the relative position error can otherwise also take place after projection of the image onto the 3D point model. The projection of an edge of a building onto a 3D point model can thus not overlap with the corresponding edge in the 3D point model, whereby a relative position error can be derived.

BRIEF DESCRIPTION OF THE DRAWINGS

The invention will be discussed in more detail hereinbelow with reference to the accompanying figures, wherein:

FIG. 2 shows a schematic view of a photo for use in a method according to the present invention;

DETAILED DESCRIPTION OF THE INVENTION

It is not really important per se to the invention how the required photos are obtained and in which direction they are taken. As long as sufficient image information from the images for a panoramic image to be generated is available for the purpose of assigning colour to the points in the 3D point model, a two-dimensional view of the 3D point model can be obtained which gives the impression of being a panoramic image in the form of a photo.

An object of the present invention is to finally generate panoramic images of the surrounding area with a large number of image elements so that the surrounding area is shown in great detail, greater than is possible with a single recording by means of a conventional camera. In this example use is therefore made, for illustrative purposes and by way of comparison to the prior art, of a single vehicle 110 (FIG. 1A) with two cameras 112 and 114 mounted thereon which do not have exactly the same orientation but have a slightly overlapping field of view. According to the prior art the recordings of these cameras 112 and 114 could be combined by means of stitching to form a single image with a greater number of image elements. Due to the distance between the entrance pupils of cameras 112 and 114 this will however produce an image with parallax errors.

Figure 1A:
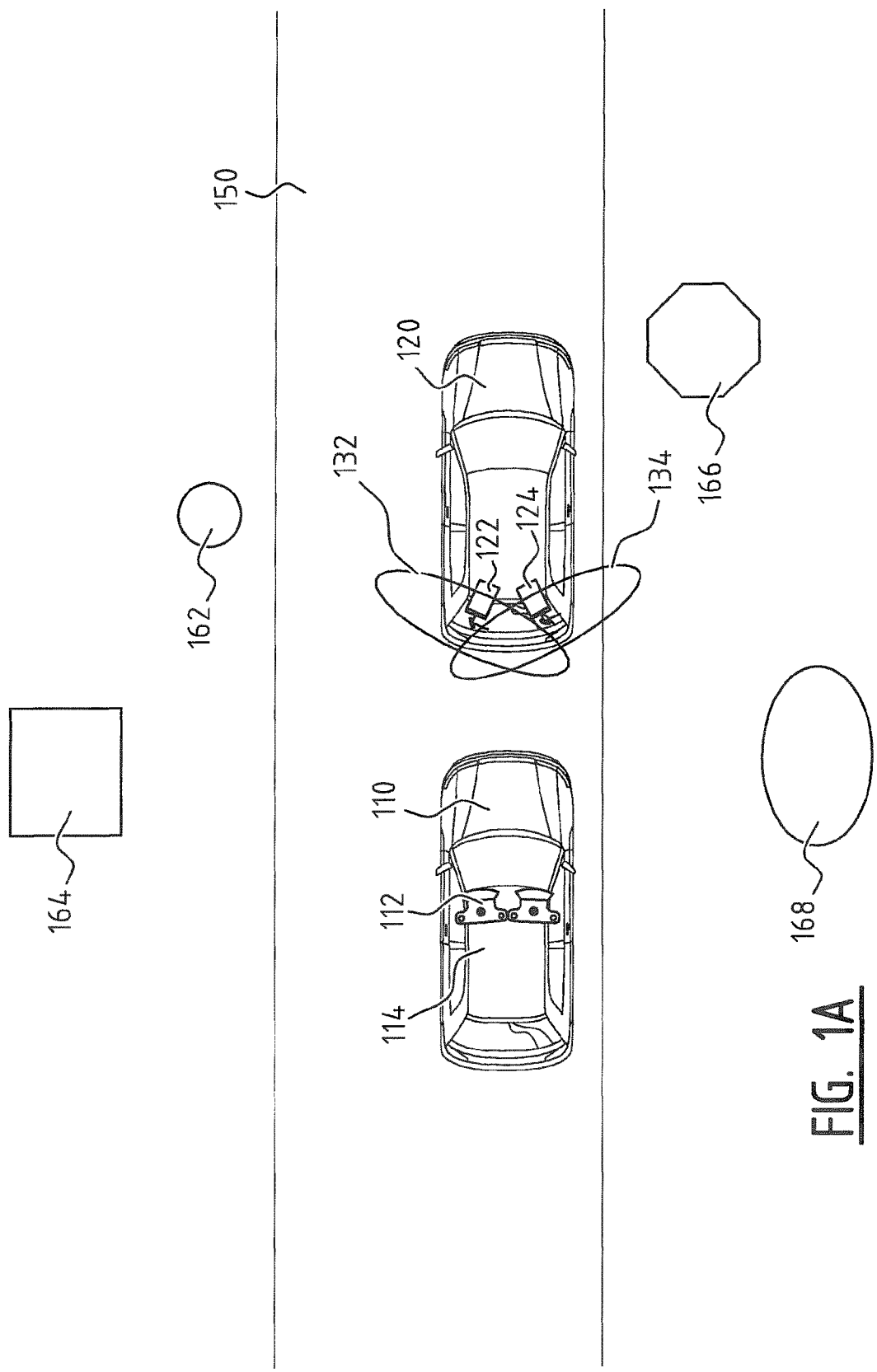
FIG. 1A shows two vehicles for performing several steps of a method according to the present invention.
Figure 1B:
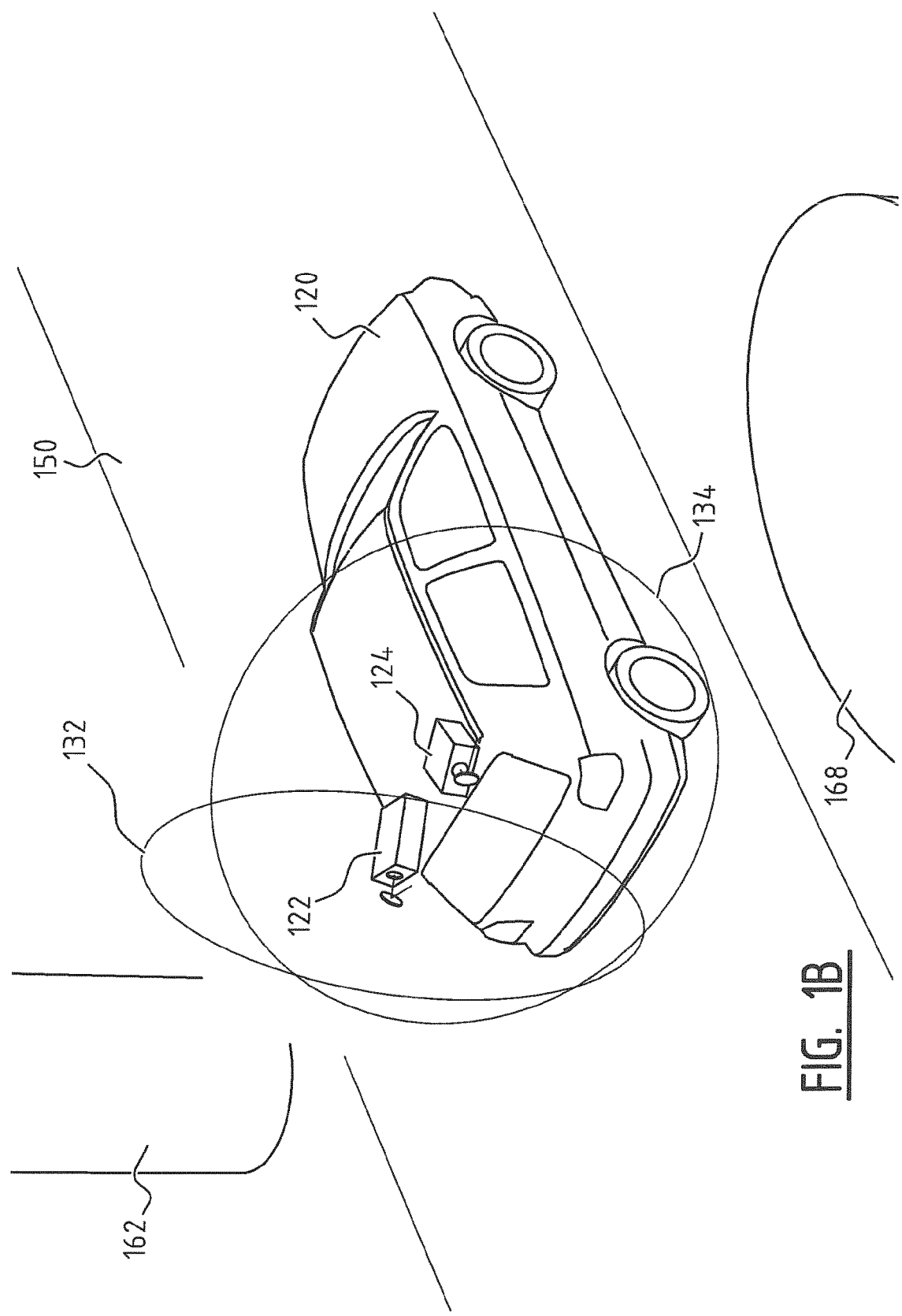
FIG. 1B shows a detail view of one of the vehicles of FIG. 1A.

A three-dimensional model is further made of the surrounding area by providing a vehicle 120 with two LIDAR devices 122 and 124 (FIGS. 1A and 1B). These LIDAR devices 122 and 124 have a rotating laser beam with which the surrounding area is scanned. The rotating laser beams each define a respective plane 132 and 134 in which objects 162, 164, 166 and 168 are detected in the surrounding area. LIDAR devices 122 and 124 scan only in a plane 132, 134 but, because vehicle 120 moves forward over a road 150, the whole surrounding area is scanned. LIDAR devices 122 and 124 emit a laser beam. The distance of the LIDAR device to an object can be determined on the basis of the time taken by a reflection to return to LIDAR device 122, 124. Since the direction in which the laser beam is emitted is also known, the relative position of the object onto which the laser beam is reflected in relation to the LIDAR device is known. By also storing each position of LIDAR device 122, 124, for instance determined by means of GPS, the absolute position of the reflections is thus known.

FIG. 2 shows an example of a recording 200 made by one of the cameras 112, 114. The recording 200 shows a view of road 150 and objects 162, 164, 166 and 168 in the surrounding area. Recording 200 is preferably made with high resolution using a digital camera 112, 114.

Figure 3:
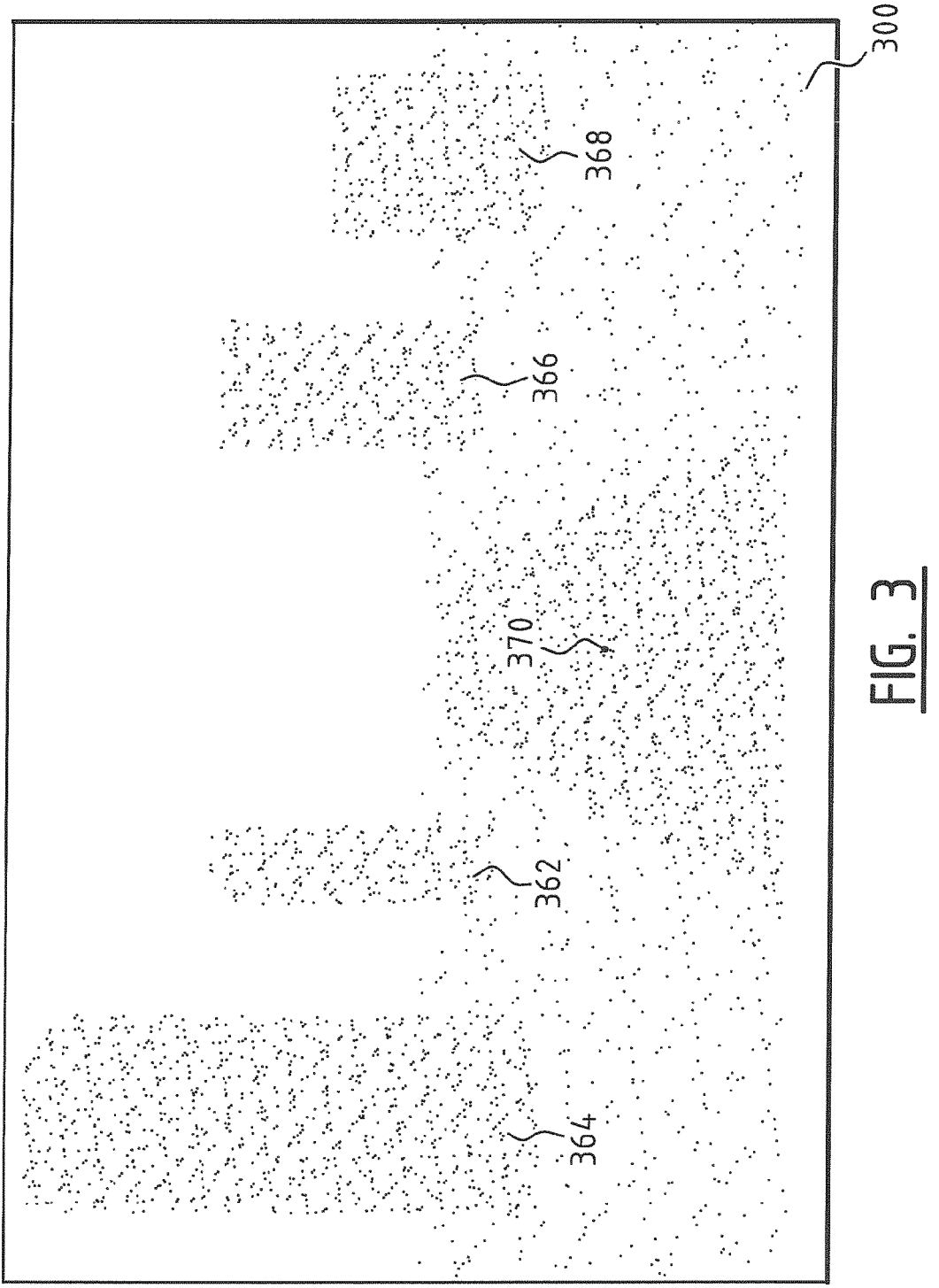
FIG. 3 shows a three-dimensional model for use in a method according to the present invention.

A three-dimensional model 300 (FIG. 3) of the surrounding area is made using LIDAR devices 122, 124. Objects 162, 164, 166 and 168 are defined in the 3D point model by respective point clusters 362, 364, 366 and 368. The road 150 is likewise defined by a point cluster 370. The same is the case for the ground surface. The points in the 3D point model thus correspond to points where light has been reflected due to the presence of a material structure. FIG. 3 shows a view of the 3D point model 300 from the same viewpoint from which photo 200 was taken.

Figure 4:
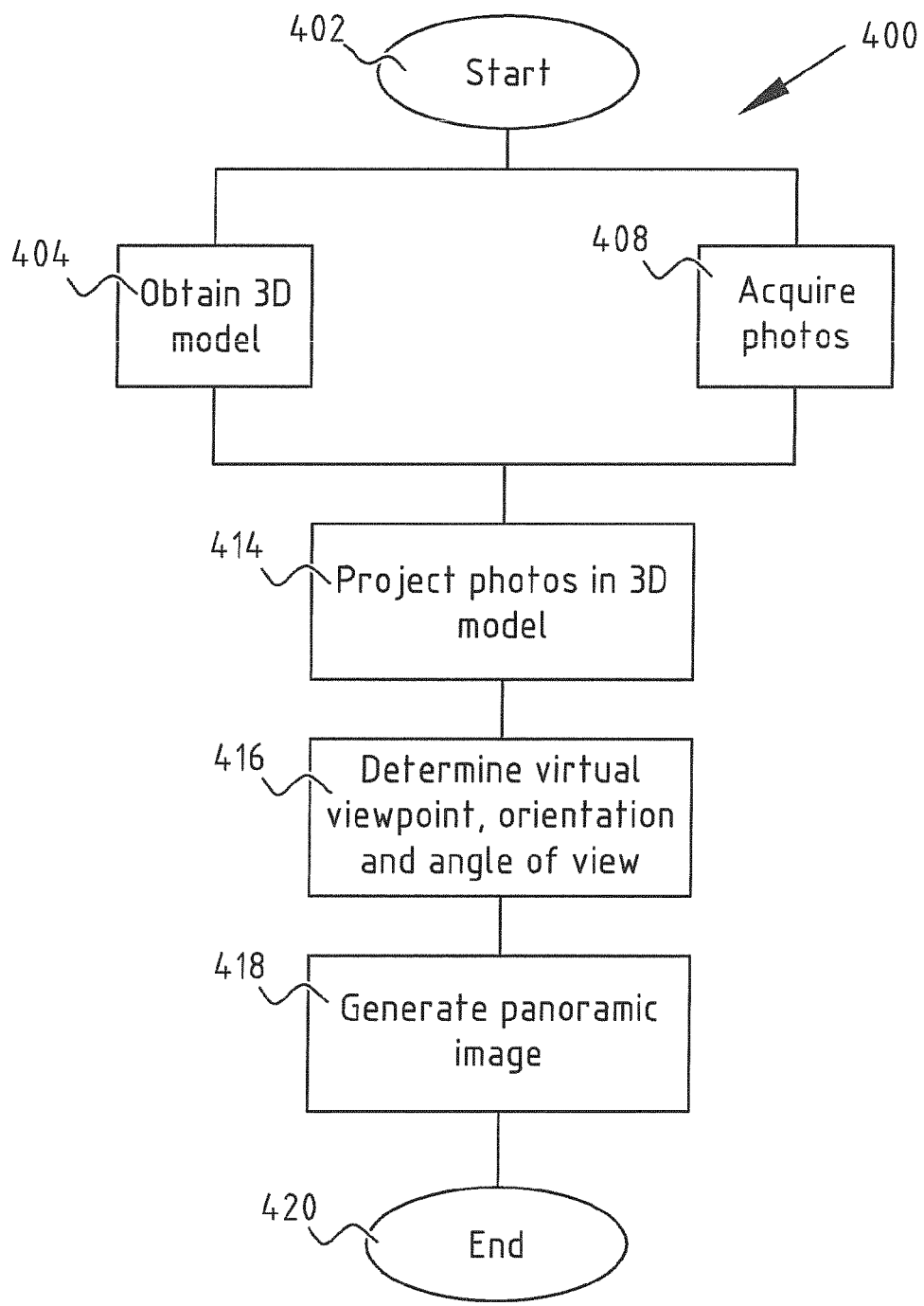
FIG. 4 shows a flow diagram of a method according to the present invention.

An exemplary method 400 (FIG. 4) according to the present invention comprises the following: the method is based on a number of photos 200 which have to be acquired 408 and a 3D point model 300 (obtained in step 404) of the surrounding area where photos 200 were taken. The 3D point model 300 could for instance be a three-dimensional CAD drawing of the surrounding area. Such drawings are however often unavailable, for instance in older neighbourhoods. CAD drawings may be available of individual buildings in newer neighbourhoods. Drawings of entire neighbourhoods are exceptional. Furthermore, these drawings have often not been provided with absolute position data. It is therefore recommended in practice to obtain the 3D point model 300 using a LIDAR device 122, 124. This produces point clusters in a three-dimensional space without further processing, these point clusters representing the outer surfaces of objects in the surrounding area.

Once the 3D point model 300 and photos 200 have been acquired, photos 200 are projected 414 into 3D point model 300. The individual image elements from photos 200, for instance in the form of pixels, are projected by searching for the point in the 3D point model 300 along the projection line which lies within a set distance from the projection line and is located closest to the viewpoint from which photo 200 was taken. The projection line extends here from the entrance pupil through the photo to the 3D point model, see FIG. 6. The colour of the pixel is then assigned to this corresponding point in the 3D point model 300, wherein the colour is optionally modified. The 3D point model 300 is in this way coloured in using photos 200. The above stated set distance need not otherwise be a fixed distance. A 3D point model 300 obtained by mounting LIDAR devices 122, 124 on a car which drives through the area will thus generally produce point clouds which are less dense at greater height above the ground than close to the ground, since LIDAR device 122, 124 scans at a fixed angle during rotation and the distance between the individual scan lines (the directions in which the laser beam is emitted) diverges as the distance from LIDAR device 122, 124 increases. It is advantageous in such situations to make the set distance dependent on for instance the height above the ground and/or the distance to the viewpoint from which the photo is taken.

A viewpoint is then determined 416 associated with the panoramic image to be generated, as well as an associated orientation, or viewing direction, and a field of view, in order to use the 3D point model 300 in the subsequent step, step 418, to generate the panoramic image, whereby the method ends 420.

Figure 5:
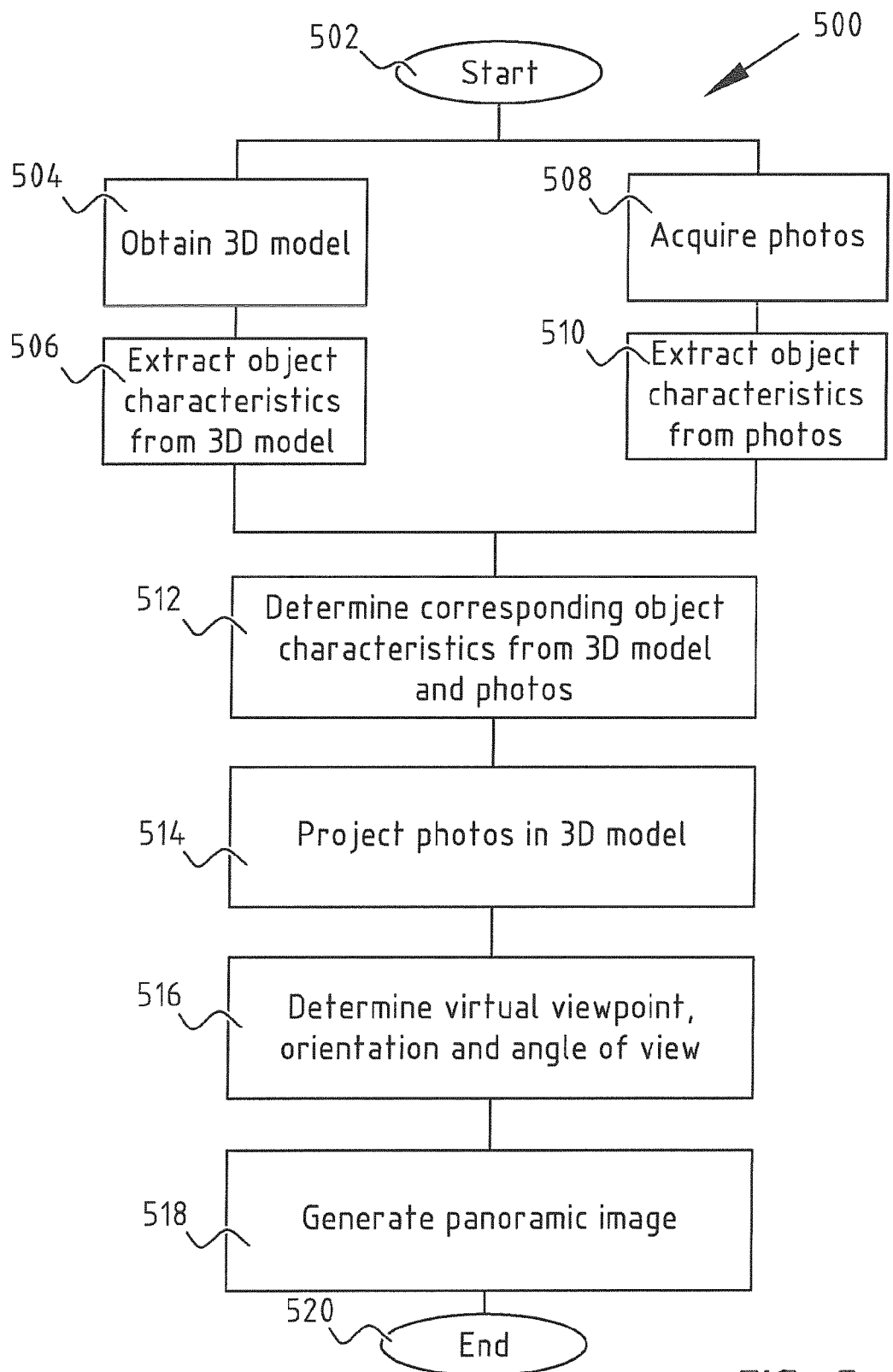
FIG. 5 shows a flow diagram of a more specific method according to the present invention.

In a further embodiment (FIG. 5) additional steps are taken in order to reduce the chance of parts of photos 200 being projected onto the wrong objects in the 3D point model 300. This method 500 begins 502 and in the first instance performs the steps already discussed above of obtaining 504 the 3D point model 300 and acquiring 508 photos 200.

After obtaining 504 the 3D point model 300, object characteristics are extracted 506 from the 3D point model 300. Object characteristics are likewise extracted 510 from photos 200. Object characteristics should be understood to mean characteristics of objects which are relatively easily to identify both in the 3D point model 300 and in photos 200, such as edges and corners of objects contrasting sharply with the background.

Once object characteristics have been extracted from 3D point model 300 and from photos 200, a search 512 is made for corresponding pairs of object characteristics in 3D point model 300 on the one hand and in photos 200 on the other. Photos 200 are then once again projected 514 in 3D point model 300, although the corresponding object characteristic pairs are now taken into account during the projection. This is done by mutually aligning the corresponding object characteristics in the projection process so that image points belonging to foreground objects are for instance projected onto the foreground objects, and image points belonging to background objects are projected onto background objects. Just as in the method of FIG. 4, a virtual viewpoint is then determined 516 with orientation and field of view, after which the panoramic image is generated, whereby the procedure ends 520.

Figure 6:
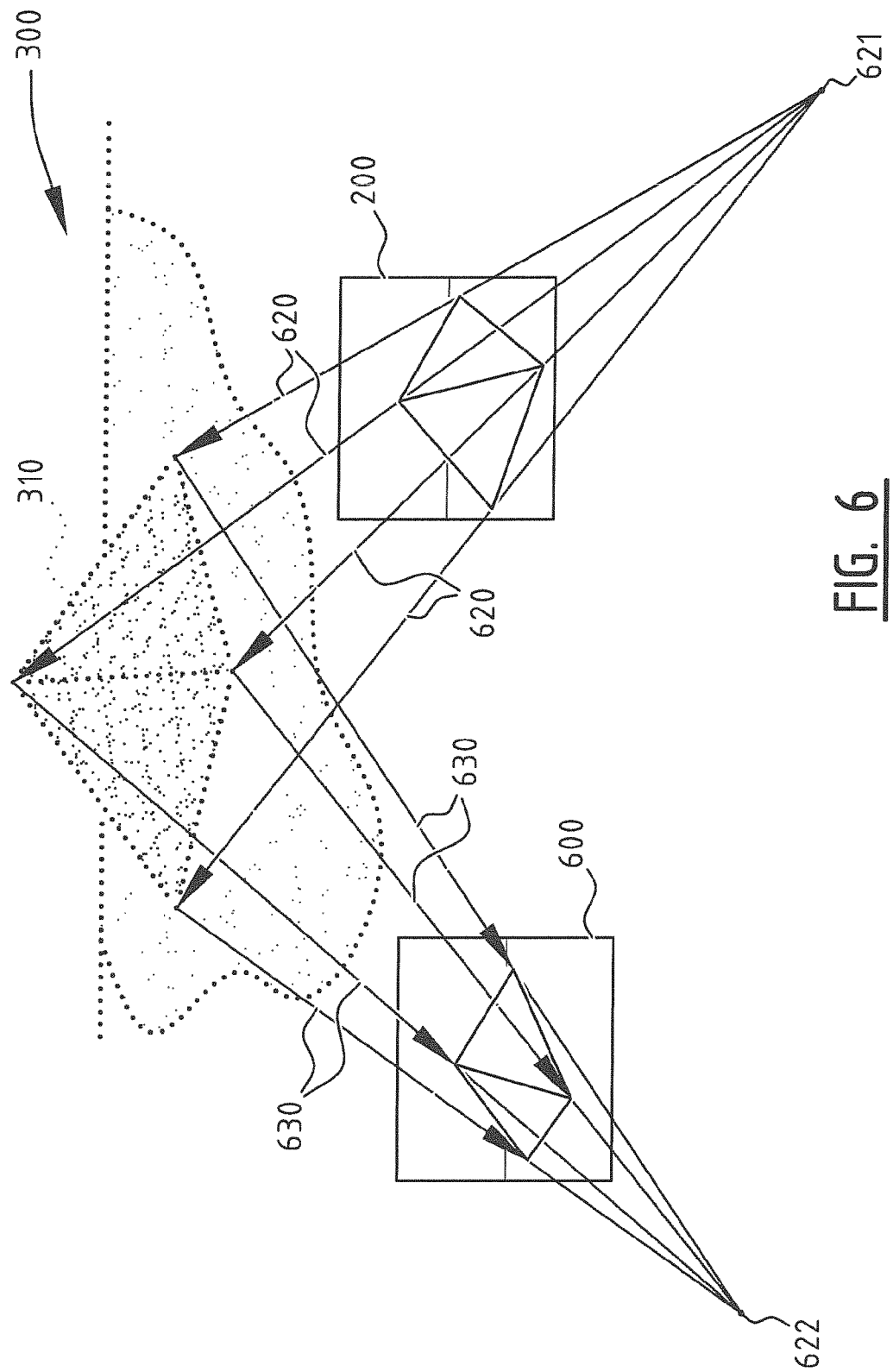
FIG. 6 shows a schematic axonometric view of the method according to the present invention.

The foregoing is elucidated with reference to FIG. 6. Shown herein is a 3D model 300 of a church building, wherein the church building is represented by a point cluster comprising points 310 as could be obtained with a LIDAR device 122, 124. For the purpose of making the figure clear, the edges of the planes in the 3D point model 300 are shown in dotted lines. In the actual 3D point model 300 the points 310 at or close to the edges are however not easily distinguishable from the other points 310 lying for instance in the centre of a plane.

At least one photo 200 is projected onto 3D point model 300 along projection lines 620. Projection lines 620 are determined by the geometry of the optical system of the camera with which photo 200 is acquired and extend from position 621 of the entrance pupil at the time photo 200 is taken, through photo 200 and in the direction of the 3D point model. The 3D point model can comprise multiple points lying in the vicinity of projection line 620. Generally chosen will be the point lying closest to position 621 and projection line 620. This projection along projection lines 620 assigns colours to the points 310 in 3D point model 300. Additional points 310 are optionally added to 3D point model 300.

The (optionally partially) coloured-in 3D point model 300 is then used to generate a panoramic image 600. This can once again take place by means of projection, though now from 3D point model 300 in the direction of a virtual viewpoint 622. Use is made for this purpose of projection lines 630 extending from the points of 3D point model 300 to virtual viewpoint 622.

It will be apparent to the skilled person that the embodiment shown in FIG. 6 serves only for the purpose of illustration. This method is used in practice to generate panoramic images which provide an image of an area surrounding virtual viewpoint 622 and not a single object as in FIG. 6. In such a case the 3D point model comprises points all around virtual viewpoint 622. Virtual viewpoint 622 is as it were situated in the 3D point model and not, as could be concluded from FIG. 6, outside the 3D point model.

The embodiments described here and shown in the figures are only exemplary embodiments which are included only for the purpose of illustrating the invention. These embodiments should therefore not be deemed as limitative. It will be apparent to the skilled person that many modifications and alternatives are possible within the invention. Aspects of different embodiments can thus for instance be combined to form new embodiments. The protection sought is limited solely by the following claims.

The invention claimed is:

1. A method for generating a panoramic image of an area surrounding a virtual viewpoint as seen from the virtual viewpoint and corresponding to a predetermined field of view, comprising the steps of:

providing a three dimensional (3D) point model of the area surrounding the virtual viewpoint, wherein the 3D point model comprises points with position information, the points corresponding to one or more elements around the virtual viewpoint at a position corresponding to the position information, the position information of the points in the 3D point model having an accuracy;

using one or more optical cameras for acquiring multiple images of the area surrounding the virtual viewpoint, each image acquired from a respective known position and with a respective known orientation of the camera with which said each image was taken, wherein the images comprise colour information about at least a part of the one or more elements, said respective known position and said respective known orientation associated with the multiple images having an accuracy;

projecting the acquired images onto the 3D point model in order to obtain a 3D point model with colour information per point; and generating the panoramic image using the thus obtained 3D point model of the surrounding area;

wherein providing the 3D point model comprises scanning the area surrounding the virtual viewpoint with a distance determining unit from one or more known positions for the purpose of determining a distance between the one or more known positions and the one or more elements, wherein providing the 3D point model comprises moving along a path a vehicle on which the distance determining unit is mounted, wherein the vehicle moves during the distance determination, wherein acquiring multiple images of the area surrounding the virtual viewpoint comprises taking digital photos, each from said respective known position and each with said respective known orientation, wherein acquisition of multiple images of the area surrounding the virtual viewpoint comprises using said one or more optical cameras for recording the digital photos, which camera(s) is/are mounted on the vehicle or a different vehicle, that moves during acquisition of the multiple images;

wherein the method further comprising the steps of:

extracting a first object characteristic from the 3D point model; and extracting a second object characteristic, corresponding to the first object characteristic, from an image from the multiple images, wherein projection of an image from the multiple images onto the 3D point model takes into account the first object characteristic and second object characteristic by mutually aligning the corresponding object characteristics in the projection process so that image points belonging to foreground objects are projected onto the foreground objects in the 3D point model, and image points belonging to background objects are projected onto background objects in the 3D point model;

wherein the method further comprising the steps of:

determining a relative position error between the image from which the second object characteristic was extracted and the 3D point model by determining the distance between the position of the first object characteristic and the second object characteristic; and correcting the position information of a point in the 3D point model and correcting the known position and the orientation from which the image from which the second object characteristic was extracted has been acquired using the determined relative position error, using a weighting related to the accuracy for each of the position information of the point in the 3D point model, the known position from which the image from which the second object characteristic was extracted has been acquired, and the orientation from which the image from which the second object characteristic was extracted has been acquired.

2. The method as claimed in claim 1, wherein the virtual viewpoint is situated on or in the smallest enclosing sphere, ellipsoid, beam or box which encloses all points from the 3D point model.

3. The method as claimed in claim 1, wherein the 3D point model provides information about the presence of the one or more elements in directions corresponding to the angle of view in the horizontal plane, as seen from the virtual viewpoint, of at least 270 degrees; and/or wherein the 3D point model provides information about the presence of the one or more elements in directions corresponding to an angle of view in the vertical plane, as seen from the virtual viewpoint, of at least 150 degrees.

4. The method as claimed in claim 1, wherein providing the 3D point model comprises of combining multiple distance determinations relating to the same element from different known positions.

5. The method as claimed in claim 4, wherein the vehicle comprises a plurality of distance determining units which are directed at different angles.

6. The method as claimed in claim 1, wherein the distance determining unit comprises a Light Detection and Ranging (LIDAR) unit.

7. The method as claimed in claim 1, wherein the field of view of the panoramic image in the horizontal plane is preferably equal to or more than 180 degrees; and/or wherein the field of view of the panoramic image in the vertical plane is preferably equal to or more than 120 degrees.

8. The method as claimed in claim 1, wherein the position information comprises three-dimensional position information relative to a predetermined origin.

9. The method as claimed in claim 1, wherein the multiple images cover the whole surrounding area as seen from the virtual viewpoint.

10. The method as claimed in claim 1, wherein at least one of the acquired images has fewer image elements therein than the generated panoramic image.

11. The method as claimed in claim 1, wherein the digital photos each relate to a segment of the area surrounding the virtual viewpoint.

12. The method as claimed in claim 1, wherein the fields of vision associated with at least two of the digital photos do not overlap and/or wherein the position from which the photo has been taken differs in the case of at least two digital photos.

13. The method as claimed in claim 1, wherein a shortest distance between the path along which the movement of the vehicle takes place and the virtual viewpoint is smaller than a predetermined value.

14. The method as claimed in claim 1, wherein the distance between the virtual viewpoint and each of the known positions from which the multiple images are acquired is smaller than a predetermined value.

15. The method as claimed in claim 1, wherein the position from which the image of the multiple images is acquired or the known position(s) for the distance determination are determined by means of a positioning system such as a global positioning system (GPS).

16. The method as claimed in claim 1, wherein said projecting the acquired images onto the 3D point model in order to obtain a 3D point model with colour information per point comprises assigning a colour to a point in the 3D point model, this colour being based on a colour of a corresponding point in the image, taking into account the position information of that point in the 3D point model, the position from which the image has been acquired and the orientation associated with the image.

17. The method as claimed in claim 1, wherein said projecting the acquired images onto the 3D point model in order to obtain a 3D point model with colour information per point comprises the steps of:

a) determining for a point from the image a corresponding point in the 3D point model which lies closest to the known position from which the image has been acquired and which is located less than a predetermined distance from a projection line which passes through the point from the image and the known position; and b) assigning a colour to the point in the 3D point model found in step a), wherein the colour is derived from the colour of the corresponding point from the image.

18. The method as claimed in claim 1, further comprising the step of improving the 3D point model on the basis of the existing 3D point model and the image from the multiple images.

19. The method as claimed in claim 18, wherein generation of the panoramic image using the thus obtained 3D point model of the surrounding area comprises generation using the improved 3D point model.

20. The method as claimed in claim 18, wherein improvement of the 3D point model comprises the steps of:

a) determining for a point from the image a plurality of corresponding points in the 3D point model which lie closest to the known position from which the image has been acquired and which are located less than a predetermined distance from a projection line which passes through the point from the image and the known position;

b) adding another point to the 3D point model, which added point is assigned position information corresponding to an interpolation of the position information of said plurality of corresponding points; and c) assigning a colour to the point added in step b), wherein the colour is derived from the colour of the corresponding point from the image.

* * * * *